(12) United States Patent
Tomabechi

(10) Patent No.: US 12,244,440 B2
(45) Date of Patent: Mar. 4, 2025

(54) COMMUNICATION APPARATUS AND COMMUNICATION SYSTEM

(71) Applicant: CANON KABUSHIKI KAISHA, Tokyo (JP)

(72) Inventor: Masaru Tomabechi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 18/177,044

(22) Filed: Mar. 1, 2023

(65) Prior Publication Data

US 2023/0291614 A1  Sep. 14, 2023

(30) Foreign Application Priority Data

Mar. 11, 2022 (JP) .................................. 2022-037792

(51) Int. Cl.
*H04L 25/02* (2006.01)

(52) U.S. Cl.
CPC ...... *H04L 25/0298* (2013.01); *H04L 25/0272* (2013.01)

(58) Field of Classification Search
CPC ............ H04L 25/0298; H04L 25/0272; H04L 25/0266

See application file for complete search history.

(56) References Cited

U.S. PATENT DOCUMENTS

| 2013/0334890 A1* | 12/2013 | Fricker | ................... H01F 38/14 307/104 |
| 2019/0115644 A1* | 4/2019 | Wang | ...................... H01P 5/183 |

FOREIGN PATENT DOCUMENTS

JP    2014096612 A    5/2014

* cited by examiner

*Primary Examiner* — Jung Kim
(74) *Attorney, Agent, or Firm* — Canon U.S.A., Inc., IP Division

(57) ABSTRACT

A communication apparatus includes a first substrate including a first transmission line, a metal portion functioning as a ground for the first substrate, spaced apart from the first transmission line, and a first termination circuit configured to terminate the first transmission line. The first substrate is fixed to any one of surfaces of the metal portion other than a surface where the first transmission line is disposed.

12 Claims, 4 Drawing Sheets

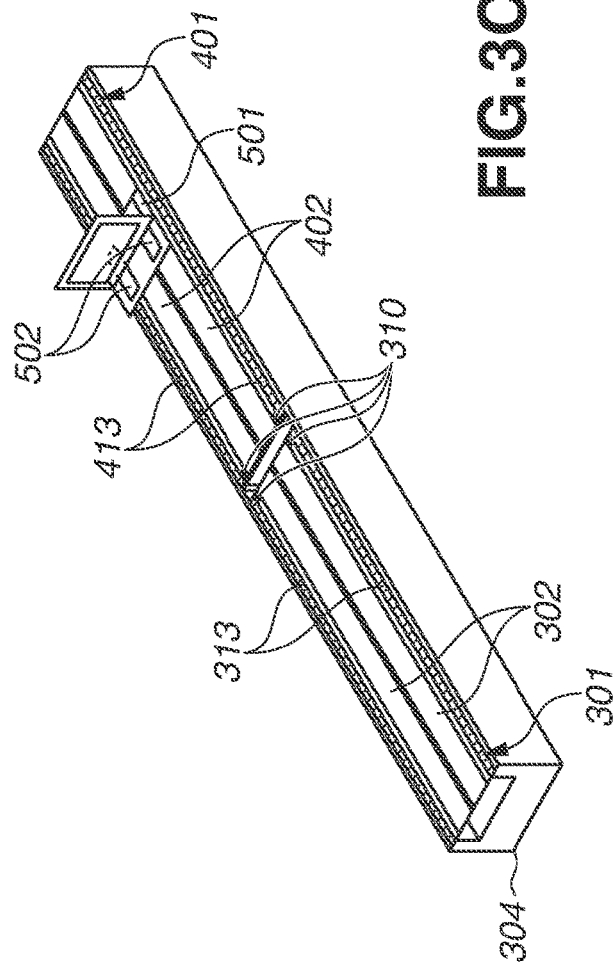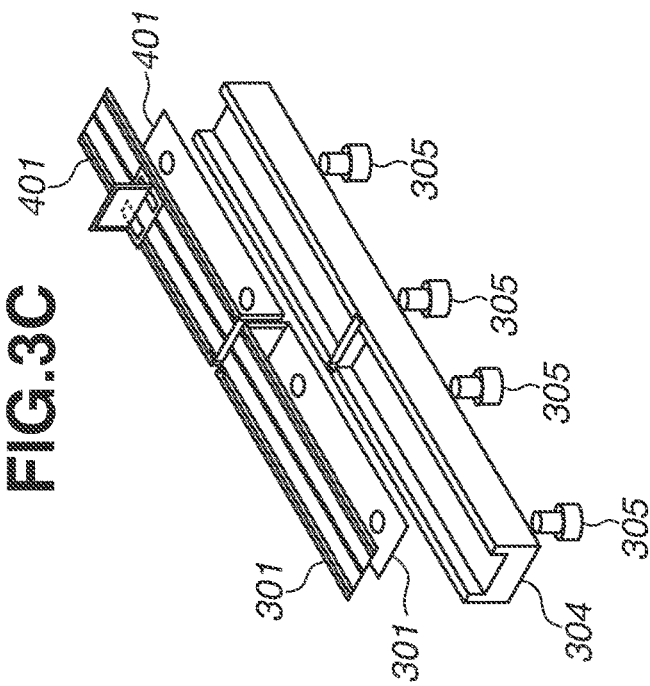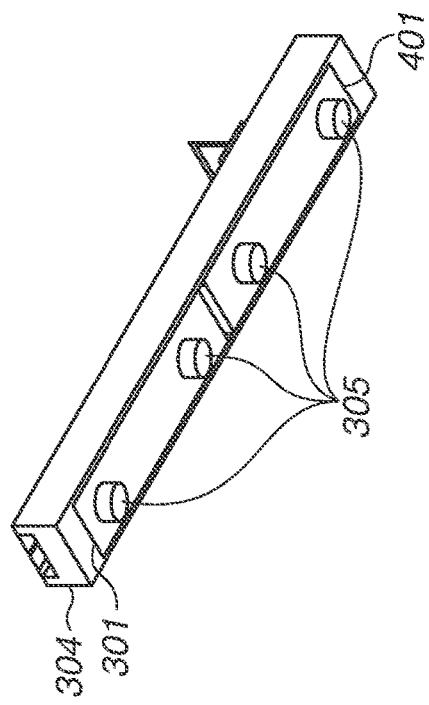

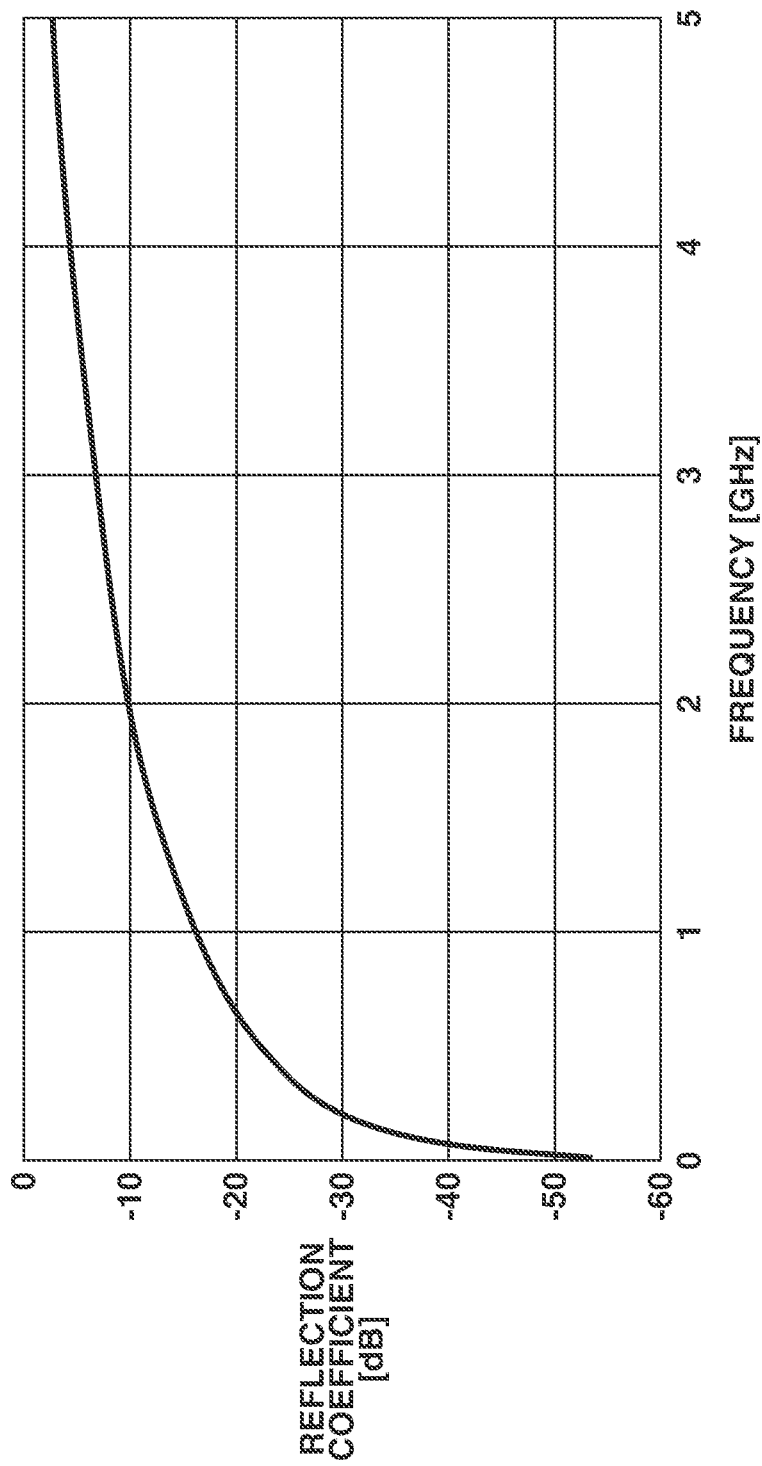

COMMUNICATION APPARATUS AND COMMUNICATION SYSTEM

BACKGROUND

Field of the Disclosure

The present disclosure relates to a communication apparatus and a communication system.

Description of the Related Art

Some known communication systems perform wireless communication using electromagnetic field coupling between nearby devices. For example, wireless data transmission is performed in a rotatable portion of a robot arm portion, a network camera, and the like, thus reducing the abrasion of cables and achieving free turning.

Japanese Patent Application Laid-Open No. 2014-96612 discusses an information communication system including a first information communication apparatus and a second information communication apparatus. The first information communication apparatus includes a first non-contact power transmission coil and a first proximity wireless communication antenna that is formed coaxially with the first non-contact power transmission coil. The second information communication apparatus includes a second non-contact power transmission coil corresponding to the first non-contact power transmission coil, and a second proximity wireless communication antenna that is formed coaxially with the second non-contact power transmission coil and corresponds to the first proximity wireless communication antenna.

In the information communication system discussed in Japanese Patent Application Laid-Open No. 2014-96612, communication characteristics can vary due to variations in the distance between the first information communication apparatus and the second information communication apparatus, which may cause a communication error. If an electrical connection between a resistor and a metal portion functioning as a ground cannot be stabilized, reflection characteristics vary and a communication error is more likely to occur near the terminal ends.

SUMMARY

The present disclosure is directed to reducing communication errors by firmly fixing substrates.

According to an aspect of the present disclosure, a communication apparatus includes a first substrate including a first transmission line, a metal portion functioning as a ground for the first substrate, spaced apart from the first transmission line, and a first termination circuit configured to terminate the first transmission line. The first substrate is fixed to any one of surfaces of the metal portion other than a surface where the first transmission line is disposed.

Further features of the present disclosure will become apparent from the following description of embodiments with reference to the attached drawings.

BRIEF DESCRIPTION OF THE DRAWINGS

FIG. 3A is a top perspective view illustrating terminal ends of differential transmission lines, FIG. 3B is a bottom perspective view illustrating the terminal ends of the differential transmission lines, and FIG. 3C is an exploded perspective view illustrating members illustrated in FIGS. 3A and 3B.

FIG. 4 is a graph illustrating reflection characteristics with respect to resistance values of terminating resistors.

DESCRIPTION OF THE EMBODIMENTS

Exemplary embodiments of the present disclosure will be described below with reference to the accompanying drawings.

Figure 1A:
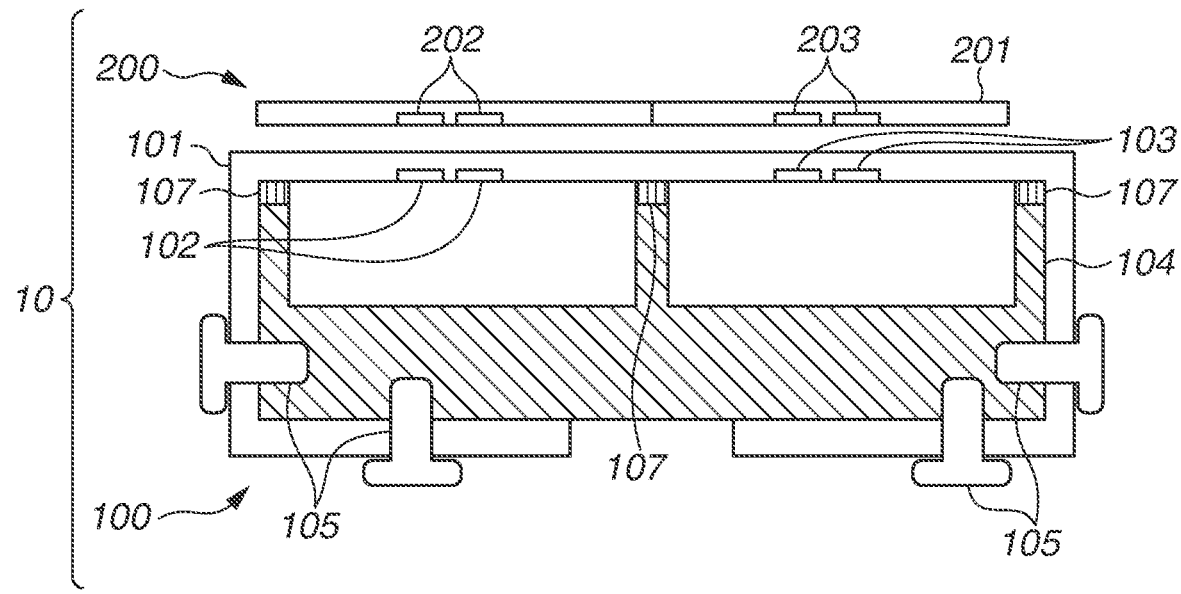
FIG. 1A is a sectional view illustrating a configuration example of a communication system according to a first embodiment.
Figure 1B:
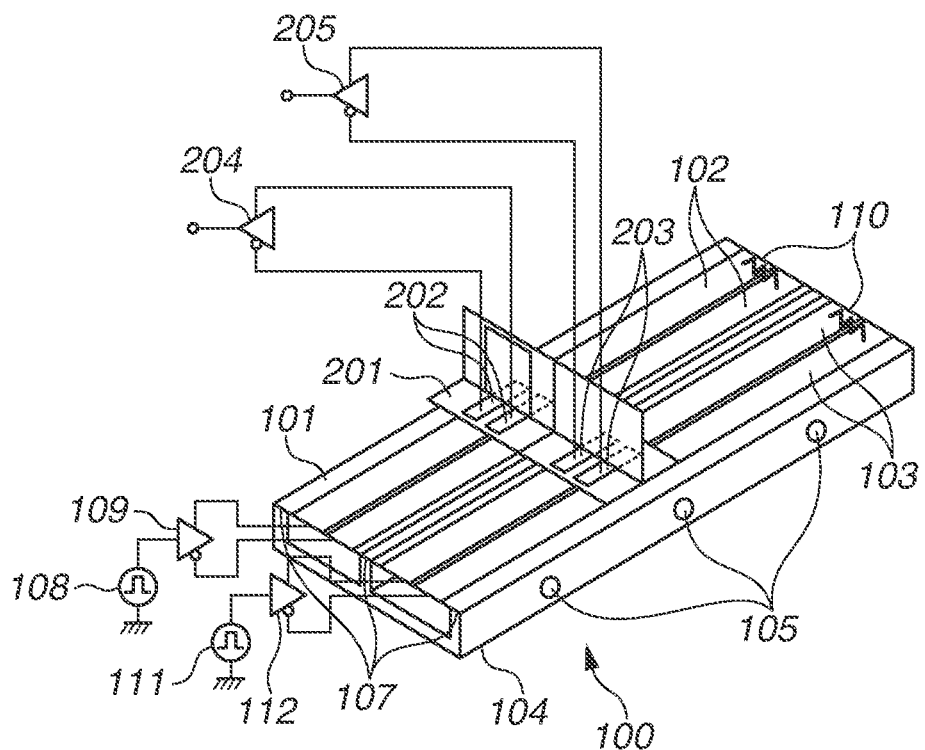
FIG. 1B is a perspective view illustrating a configuration example of the communication system according to the first embodiment.

A first embodiment of the present disclosure will be described below. FIG. 1A is a sectional view illustrating a configuration example of a communication system 10 according to the first embodiment. FIG. 1B is a perspective view illustrating a configuration example of the communication system 10 according to the first embodiment. The communication system 10 includes a transmission-side communication apparatus 100 and a reception-side communication apparatus 200.

The transmission-side communication apparatus 100 and the reception-side communication apparatus 200 wirelessly communicate with each other using electromagnetic coupling between transmission lines to be described below. The electromagnetic coupling according to the first embodiment includes electric field coupling and magnetic field coupling. In other words, the wireless communication between the transmission lines may be performed by one or both of electric field coupling and magnetic field coupling.

The transmission-side communication apparatus 100 illustrated in FIG. 1A will now be described. The transmission-side communication apparatus 100 is elongated along the direction perpendicular to the plane of FIG. 1A. The transmission-side communication apparatus 100 includes substrates 101, metal portions 104, and fixing members 105.

Each substrate 101 is a flexible printed circuit board. Each substrate 101 is made of material such as polyimide, polyester, or liquid crystal polymer. Each substrate 101 includes flat upper and lower surfaces and is deformable in the direction perpendicular to the upper and lower surfaces. The transmission-side communication apparatus 100 according to the present embodiment has a configuration in which two of the substrates 101 are arranged side by side in parallel in the longitudinal direction. The transmission-side communication apparatus 100 may have a configuration in which three or more substrates 101 are arranged side by side in parallel, or a plurality of substrates 101 is integrally formed.

The substrates 101 each include transmission lines 102 and 103. The transmission lines 102 and 103 are formed as patterns on the substrates 101. The transmission lines 102 are on the transmission-side and used for transmitting wireless signals to transmission lines 202 of the reception-side communication apparatus 200, and the transmission lines 103 are on the transmission side and used for transmitting wireless signals to transmission lines 203 of the reception-side communication apparatus 200. The transmission lines 102 and 103 each function as a transmission coupler for transmitting wireless signals.

The transmission lines 102 and 103 are linear conductor members. The transmission lines 102 and 103 are made of, for example, copper. The transmission lines 102 and 103 according to the present embodiment each have a configuration in which two linear conductor members are arranged in parallel along the longitudinal direction on the respective substrate 101 to thereby form transmission lines for differential transmission. The transmission lines 102 and 103 need not necessarily be provided on the substrates 101, respectively. The transmission lines 102 and 103 may be provided on each substrate 101.

Each metal portion 104 is a member having a reference potential for the transmission lines 102 and 103. Each metal portion 104 functions as a ground potential for the substrates 101. The metal portions 104 are spaced apart from the transmission lines 102 and 103. More specifically, each metal portion 104 has a substantially U-shaped or V-shaped section, and has a space at the center in the width direction thereof. The both ends of each metal portion 104 in the width direction are connected to the substrates 101. The transmission-side communication apparatus 100 according to the present embodiment has a configuration in which the two metal portions 104 are arranged side by side in parallel in the longitudinal direction. Alternatively, three or more metal portions 104 may be arranged side by side in parallel, or a plurality of metal portions 104 may be integrally formed.

Each substrate 101 is connected to the corresponding metal portion 104 with the fixing members 105 on any one of the surfaces of the metal portion 104 other than a surface where each substrate 201 is disposed as viewed from the corresponding metal portion 104. This configuration makes it possible to firmly fix the substrates 101 while minimizing the distance between the substrates 101 and the substrates 201 and increasing the strength of wireless communication signals. The substrates 101 are bonded to the metal portions 104 with an adhesive 107. What is disposed between the substrates 101 and the metal portions 104, such as the adhesive 107, is also useable on the surface where the substrates 201 are disposed as viewed from the corresponding metal portion 104. While the present embodiment illustrates an example where each substrate 101 is fixed to three surfaces of the corresponding metal portion 104 with the fixing members 105 and the adhesive 107, any combination of surfaces of the metal portion 104 is applicable, as long as each substrate 101 is fixed to two or more surfaces of the corresponding metal portion 104.

Next, the reception-side communication apparatus 200 illustrated in FIG. 1A will be described. The reception-side communication apparatus 200 has a configuration along the direction perpendicular to the plane of FIG. 1A. The reception-side communication apparatus 200 includes the substrates 201. Each substrate 201 is a flexible printed circuit board or a rigid substrate. Each substrate 201 is made of material such as polyimide, polyester, liquid crystal polymer, or FR-4. Each substrate 201 includes flat upper and lower surfaces. Each substrate 201 and the transmission-side communication apparatus 100 are disposed with a space therebetween. More specifically, the substrates 201 are disposed on the opposite side of the metal portions 104 relative to the substrates 101 of the transmission-side communication apparatus 100 and are spaced apart from the substrates 101. Each substrate 201 is movable along the parallel direction, or the direction perpendicular to the plane of FIG. 1A, relative to the substrates 101.

The substrates 201 include transmission lines 202 and 203. The transmission lines 202 and 203 are formed as patterns on the substrates 201. The transmission lines 202 are on the reception side and used for receiving wireless signals from the transmission lines 102 of the transmission-side communication apparatus 100 through electromagnetic coupling, and the transmission lines 203 are on the reception side and used for receiving wireless signals from the transmission lines 103 of the transmission-side communication apparatus 100 through electromagnetic coupling. As viewed along the vertical direction, the transmission lines 202 and the transmission lines 102 at least partially overlap each other, and the transmission lines 203 and the transmission lines 103 at least partially overlap each other.

In the case of moving the substrates 201 in parallel with the substrates 101, the transmission lines 202 move along the longitudinal direction of the transmission lines 102 and the transmission lines 203 move along the longitudinal direction of the transmission lines 103. The transmission lines 202 receive wireless signals from the transmission lines 102, and the transmission lines 203 receive wireless signals from the transmission lines 103. The transmission lines 202 and 203 each function as a reception coupler for receiving wireless signals. This configuration makes it possible to perform wireless communication between the transmission lines 102 and 103 and the transmission lines 202 and 203 even when the substrates 201 are moving relative to the substrates 101. The transmission lines 202 and 203 according to the present embodiment each have a configuration in which two linear conductor members are arranged in parallel along the longitudinal direction on one substrate 201 to thereby form transmission lines for differential transmission. The arrangement of the transmission lines 202 and 203 according to the present embodiment is not limited to the configuration in which the respective substrates 201 includes either one of the transmission lines 202 and 203. In another embodiment, a single substrate 201 may include a plurality of transmission lines, that is, the transmission lines 202 and 203.

FIG. 1B is a perspective view of the communication system 10 illustrated in FIG. 1A, and illustrates a connection relation between differential transmission buffers 109 and 112 and terminating resistors 110. The transmission-side communication apparatus 100 includes signal sources 108 and 111, the differential transmission buffers 109 and 112, and the terminating resistors 110. Data output from the signal source 108 is input to one end of the transmission lines 102 as differential signals via the differential transmission buffer 109 connected to the one end of the transmission lines 102. Data output from the signal source 111 is input to one end of the transmission lines 103 as differential signals via the differential transmission buffer 112 connected to the one end of the transmission lines 103. The differential transmission buffers 109 and 112 receive output data from the signal sources 108 and 111, respectively, and output differential signals to the one end of the transmission lines 102 and the one end of the transmission lines 103, respectively. The other end of the transmission lines 102 is terminated by the corresponding terminating resistor 110 having an impedance that is substantially equal to the differential impedance of the transmission lines 102. The other end of the transmission lines 103 is terminated by the corresponding terminating resistor 110 having an impedance that is substantially equal to the differential impedance of the transmission lines 103. The two terminating resistors 110 include first and second terminating resistors 110. The first terminating resistor 110 is connected to a portion between the terminal ends of the two transmission lines 102. The second terminating resistor 110 is connected to a portion between the terminal ends of the two transmission lines 103. The two terminating resistors 110 are provided on the substrates 101.

The reception-side communication apparatus 200 includes comparators 204 and 205. The waveforms of the differential signals output from one end of the transmission line 202 and one end of the transmission line 203 are shaped by the comparators 204 and 205, respectively, and then the differential signals are detected as received signals. The comparators 204 and 205 are configured to shape the waveforms of the differential signals output from the one end of the transmission line 202 and the one end of the transmission line 203, respectively, and to output the differential signals as received signals. The configuration on the side where the transmission lines 203 are disposed is similar to the configuration on the side where the transmission lines 202 are disposed.

While the above-described embodiment illustrates an example where each transmission line is a differential microstrip line, the present embodiment is not limited to this example. For example, the transmission lines 202 and 203 in the reception-side communication apparatus 200 may be capacitive transmission lines having an open end, or may be short-circuited inductive transmission lines.

While the above-described embodiment illustrates an example where the transmission lines 102 and 103 each function as a transmission coupler for transmitting wireless signals and the transmission lines 202 and 203 each function as a reception coupler for receiving wireless signals, the present embodiment is not limited to this example. A directional coupler including the transmission coupler and the reception coupler is reversible. Thus, the transmission-side configuration and the reception-side configuration is replaceable by circuits to be connected to the transmission lines 102 and 103 being changed to circuits to be connected to the transmission lines 202 and 203. The transmission-side configuration and the reception-side configuration are also replaceable in the following embodiments.

According to the present embodiment, the substrates 101 are connected to the metal portions 104 with the fixing members 105. This configuration makes it possible to firmly fix the substrates 101 while minimizing the distance between the substrates 101 and the substrates 201 and increasing the strength of wireless communication signals. According to the present embodiment, it is possible to control variations in the distance between the substrates 101 and the substrates 201 and controls variations in communication characteristics, thus reducing or preventing communication errors.

As described above, the communication system 10 includes the transmission-side communication apparatus 100 and the reception-side communication apparatus 200 as another communication apparatus that wirelessly communicates with the transmission-side communication apparatus 100. The reception-side communication apparatus 200 includes the substrates 201 including the transmission lines 202 and 203.

The transmission-side communication apparatus 100 includes the substrates 101, the metal portions 104, and the terminating resistors 110. Each substrate 101 includes the transmission lines 102 and 103. The metal portions 104 each function as the ground for the substrates 101. The metal portions 104 are spaced apart from the transmission lines 102 and 103. The terminating resistors 110 are termination circuits and terminate the transmission lines 102 and 103, respectively. The substrates 101 are fixed to any one of the surfaces of the metal portion 104 other than the surface where the transmission lines 102 and 103 are disposed. One of the terminating resistors 110 is connected to a portion between the two transmission lines 102. The other of the terminating resistors 110 is connected to a portion between the two transmission lines 103.

The transmission lines 102 are connected to the signal source 108 via the differential transmission buffer 109.

The transmission lines 103 are connected to the signal source 111 via the differential transmission buffer 112. The transmission lines 102 and 103 are configured to perform wireless communication with the reception-side communication apparatus 200. Each substrate 101 is, for example, a flexible printed circuit board.

The substrates 101 are fixed to the metal portions 104 with any one of a metal, a fastening, a conductive adhesive, and a conductive tape, or a combination thereof. The transmission-side communication apparatus 100 is used to, for example, communicate with a network camera or a robot.

According to the present embodiment, it is possible to firmly fix the substrates 101, thus reducing communication errors.

A second embodiment of the present disclosure will now be described below. A terminating structure of each transmission line according to the second embodiment will be described. Only differences between the second embodiment and the first embodiment will be described below.

Figure 2:
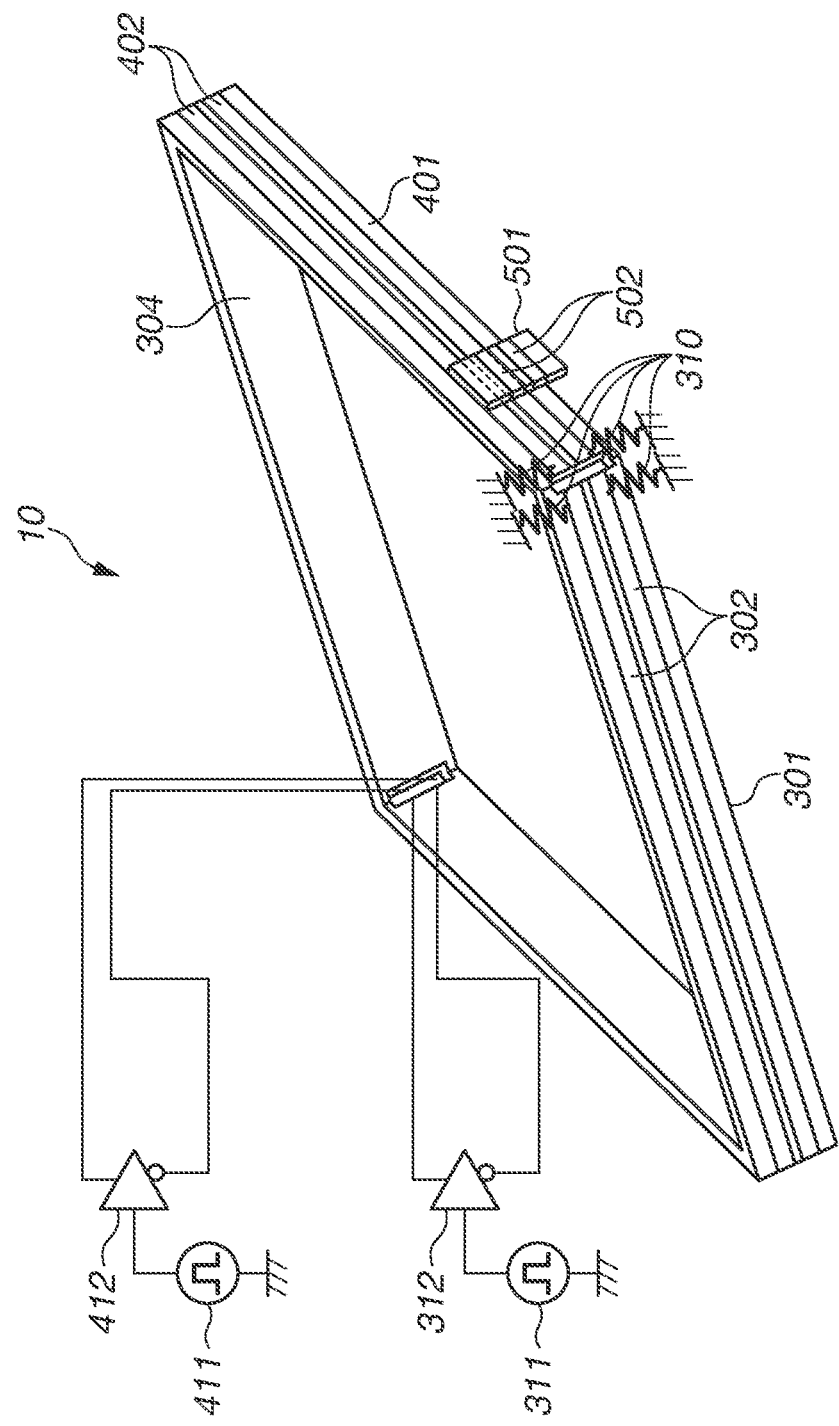
FIG. 2 is a perspective view illustrating a configuration example of a communication system according to a second embodiment.

FIG. 2 is a perspective view illustrating a configuration example of the communication system 10 according to the second embodiment. The communication system 10 illustrated in FIG. 2 differs from the communication system 10 illustrated in FIG. 1B in that substrates 301 and 401 and a metal portion 304 have a square annular shape (ring shape). In the communication system 10 illustrated in FIG. 2, signals output from two signal sources 311 and 411 are input to differential transmission lines 302 and 402, respectively, and termination portions of the differential transmission lines 302 and 402 face each other. This structure enables reception-side differential transmission lines 502 to be moved in the circumferential direction of the square annular shape of the transmission-side differential transmission lines 302 and 402, thus making it possible to perform electromagnetic communication while the differential transmission lines 502 is moving in the circumferential direction. The present embodiment is described assuming that arm hands of arm robots are used, the present embodiment is not particularly limited to arm robots. Any application can be used as long as the application is compatible with an interface for a network camera configured to turn, an interface between devices, or an interface within a device.

The transmission-side communication apparatus 100 includes the substrates 301 and 401, the differential transmission lines 302 and 402, the metal portion 304, terminating resistors 310, the signal sources 311 and 411, and differential transmission buffers 312 and 412. The reception-side communication apparatus 200 includes a substrate 501 and the differential transmission lines 502. One of the reception-side differential transmission lines 502 is moved to selectively receive differential signals from the two transmission-side differential transmission lines 302 and 402.

The substrates 301 and 401 include the differential transmission lines 302 and 402 as two linear conductor members that are arranged side by side. The differential transmission lines 302 and 402 are transmission-side differential transmission lines configured to perform non-contact communication with the differential transmission lines 502 on the substrate 501 through electromagnetic coupling.

The substrates 301 and 401 need not necessarily be formed of a plurality of substrates, and may be integrally formed. The metal portion 304 and the differential transmission lines 302 and 402 are disposed with a space therebetween, and the metal portion 304 has a reference potential for the transmission-side differential transmission lines 302 and 402. In the present embodiment, the metal portion 304 has a square annular shape. However, the metal portion 304 may have any shape other than the square annular shape, as long as the distance to the surface functioning as the reference potential for the differential transmission lines 302 and 402 is substantially constant.

The signals output from the signal source 311 are input to one end of the differential transmission lines 302 as differential signals via the differential transmission buffer 312 connected to the one end of the differential transmission lines 302. The signals output from the signal source 411 are input to one end of the differential transmission lines 402 as differential signals via the differential transmission buffer 412 connected to the one end of the differential transmission lines 402. The differential transmission buffers 312 and 412 receive the output signals from the signal sources 311 and 411, respectively, and output the differential signals to the one end of the differential transmission lines 302 and the one end of the differential transmission lines 402, respectively.

The metal portion 304 has a slit. The differential transmission lines 302 and 402 and the differential transmission buffers 312 and 412 are interconnected through the slit of the metal portion 304. The differential transmission lines 302 and 402 and the terminating resistors 310 are interconnected through the slit of the metal portion 304.

The number of signal sources and the number of differential transmission lines are not limited to two. One or three or more signal sources and one or three or more differential transmission lines may be provided. A single signal source may be used and a distributor or the like may be used to input signals to the corresponding transmission line. The terminating resistors 310 are disposed on the metal portion (ground) 304 side with respect to the surfaces of the substrates 301 and 401, and are configured to terminate the differential transmission lines 302 and 402.

A detailed structure at terminal ends of the differential transmission lines 302 and 402 near the terminating resistors 310 will be described with reference to FIGS. 3A to 3C. FIG. 3A is a top perspective view illustrating the terminal ends of the differential transmission lines 302 and 402. FIG. 3B is a bottom perspective view illustrating the terminal ends of the differential transmission lines 302 and 402. FIG. 3C is an exploded perspective view illustrating the members illustrated in FIGS. 3A and 3B.

The metal portion 304 has the slit near the terminating resistors 310. Conductor portions 313 and 413 that are formed on the substrates 301 and 401 are connected to the terminating resistors 310 and function as the ground.

The conductor portions 313 and 413 are each made of material such as copper.

The conductor portions 313 and 413 are metallic patterns formed on the substrates 301 and 401. The substrates 301 and 401 and the conductor portions 313 and 413 are drawn out from the slit formed in the metal portion 304. The substrates 301 and 401 and the conductor portions 313 and 413 that are drawn out from the slit are connected to the metal portion 304 with fixing members 305 on the side opposite to the side where the substrate 501 is disposed as viewed from the metal portion 304. The metal portion 304 and the conductor portions 313 and 413 are crimped by the fixing members 305 and are electrically connected. This structure enables the conductor portions 313 and 413 to be stably electrically connected to the metal portion 304 functioning as the ground.

The four terminating resistors 310 include the first to fourth terminating resistors 310. The first and second terminating resistors 310 are disposed on the substrate 301. The third and fourth terminating resistors 310 are disposed on the substrate 401.

The two transmission lines 302 include the first transmission line 302 and the second transmission line 302. The two conductor portions 313 include the first conductor portion 313 and the second conductor portion 313. The first terminating resistor 310 is connected to a portion between the first transmission line 302 and the first conductor portion 313. The second terminating resistor 310 is connected to a portion between the second transmission line 302 and the second conductor portion 313.

The two transmission lines 402 include the first transmission line 402 and the second transmission line 402. The two conductor portions 413 include the first conductor portion 413 and the second conductor portion 413. The third terminating resistor 310 is connected to a portion between the first transmission line 402 and the first conductor portion 413. The fourth terminating resistor 310 is connected to a portion between the second transmission line 402 and the second conductor portion 413.

In this case, it is desirable that the transmission lines 302 and 402 be prevented from being drawn out toward the slit of the metal portion 304. This is because the different transmission lines 302 and 402 that face each other and are coupled together cause interference noise, which leads to degradation in communication characteristics.

FIG. 4 is a graph illustrating reflection characteristics with respect to resistance values of the terminating resistors 310. In FIG. 4, the vertical axis represents a reflection coefficient [dB] and the horizontal axis represents a signal frequency [GHz]. Here, the differential impedance for each transmission line is about 100Ω. Reflection characteristics when the differential impedance of the terminating resistors 310 is set to 100Ω are indicated by a solid line, and reflection characteristics when the differential impedance of the terminating resistors 310 is set to ∞Ω (terminating resistors 310 are not electrically connected to the metal portion 304) are indicated by a broken line. The graph indicates that stabilization of the connection state between the terminating resistors 310 and the metal portion 304 functioning as the ground enables excellent reflection characteristics to be maintained.

Thus, in the configuration in which the signals through the transmission lines 302 and 402 are branched in two or more directions and the terminal ends of the transmission lines 302 and 402 face each other, the metal portion 304 has the slit and the terminating resistors 310 and the metal portion 304 are firmly connected with the fixing members 305. This enables stabilization of the reflection characteristics at the terminal ends of the transmission lines 302 and 402.

Next, advantageous effects of the present embodiment will be described. In the case of forming a transmission line on a general substrate, the amount of attenuation in a high-frequency region increases due to dielectric loss, which makes it difficult to perform non-contact communication with high-frequency signals over a long distance. For example, in the case of forming a microstrip transmission line using a substrate that is made of FR-4 and has a thickness of 1.6 mm, attenuation characteristics when signals propagate 1 m are reduced by −20 dB or more in the frequency region of 6 GHz or more. In the case of using fluorine resin with relatively small dielectric loss as the material of the substrate, the amount of attenuation in the high-frequency band can be reduced. However, the substrate is costly.

Here, when a transmission line for transmitting signals is provided on a flexible substrate and the transmission line has a metallic (ground) upper surface as a ground surface that is substantially parallel to the flexible substrate, an air layer is formed between the transmission line and the ground surface. This enables minimization of the dielectric loss and the formation of the excellent transmission line that enables high-speed data communication over a long distance.

In such a case, it is desirable that one end of the transmission line be connected to a signal source and the other end of the transmission line be stably terminated with a resistor having an impedance that is substantially equal to the characteristic impedance of the transmission line. To prevent the flexible substrate from being displaced due to the centrifugal force during turning of a network camera or the like, a method of firmly fixing the flexible substrate is to be employed while implementing wireless communication.

If the distance between the transmission-side transmission line and the reception-side transmission line varies during turning, the communication characteristics vary, which may cause a communication error. Without a stabilized electrical connection between the terminating resistors and the metal portion functioning as the ground near the terminal ends of the transmission lines, reflection characteristics vary and a communication error is more likely to occur near the terminal ends of the transmission lines.

According to the present embodiment, the communication system 10 performs wireless data transmission in a rotatable portion of a robot arm portion, a network camera, or the like, so that the abrasion of cables is reduced and free turning is realizable.

The substrates 301 and 401 are each connected to the metal portion 304 with the fixing members 305. This configuration makes it possible to firmly fix the substrates 301 and 401 while minimizing the distance between the substrates 301 and 401 and the substrate 501 and increasing the strength of wireless communication signals. According to the present embodiment, it is possible to control variations in the distance between the substrates 301 and 401 and the substrate 501, controls variations in communication characteristics, and also controls communication errors.

The terminating resistors 310 and the metal portion 304 are firmly connected by the aid of the fixing members 305, thus stabilizing the reflection characteristics at the terminal ends of the transmission lines 302 and 402 and reduce communication errors.

As described above, the substrate 301 is fixed to any one of the surfaces of the metal portion 304 other than the surface where the transmission lines 302 are disposed. The substrate 401 is also fixed to any one of the surfaces of the metal portion 304 other than the surface where the transmission lines 402 are disposed. The metal portion 304 has, for example, an annular shape.

The transmission lines 302 are connected to any one of the surfaces of the metal portion 304 other than the surface where the transmission lines 302 are disposed via one of the terminating resistors 310. The transmission lines 402 are connected to any one of the surfaces of the metal portion 304 other than the surface where the transmission lines 402 are disposed via the other of the terminating resistors 310.

One of the terminating resistors 310 is connected to a portion between the transmission lines 302 and the conductor portions 313, and terminates the transmission lines 302. The other of the terminating resistors 310 is connected to a portion between the transmission lines 402 and the conductor portions 413, and terminates the transmission lines 402. The conductor portions 313 are connected to any one of the surfaces of the metal portion 304 other than the surface where the transmission lines 302 are disposed. The conductor portions 413 are connected to any one of the surfaces of the metal portion 304 other than the surface where the transmission lines 402 are disposed.

Each metal portion 304 has the slit. The substrate 301 and the substrate 401 are inserted into the slit of the metal portion 304, and are fixed to any one of the surfaces of the metal portion 304 other than the surface where the transmission lines 302 and the transmission lines 402 are disposed.

According to the present embodiment, it is possible to firmly fix the substrates 301 and 401 and stabilize the reflection characteristics at the terminal ends of the transmission lines 302 and 402.

The present disclosure is not limited to the above-described embodiments. Not all the combinations of features described in the embodiments described above are essential. The embodiments described in the present disclosure and the drawings are merely examples and should not be construed as limiting the present disclosure. Various modifications (including organic combinations of the embodiments) can be made based on the scope of the present disclosure, and these modifications should not be excluded from the scope of the present disclosure. In other words, all configurations obtained by combining the above-described embodiments and modifications thereof are also included in the present disclosure.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-037792, filed Mar. 11, 2022, which is hereby incorporated by reference herein in its entirety.

What is claimed is:

1. A communication apparatus comprising:
   a first substrate including a first transmission line and a second transmission line;
   a metal portion functioning as a ground for the first substrate and including a slit, a part of the metal portion being spaced apart from the first transmission line and the second transmission line; and
   a first termination circuit configured to terminate the first transmission line; and
   a second terminal circuit configured to terminate the second transmission line,
   wherein the communication apparatus communicates with another communication apparatus opposed to the communication apparatus using electric field coupling or magnetic field coupling,
   wherein a part of the first substrate is inserted into the slit of the metal portion, and
   wherein a part of the first substrate is fixed to any one of surfaces of the metal portion other than a surface where the first transmission line is opposed to the other communication apparatus.

2. The communication apparatus according to claim 1, wherein the first transmission line is connected to any one of the surfaces of the metal portion other than the surface where the first transmission line is disposed via the first termination circuit.

3. The communication apparatus according to claim 1,
wherein the first substrate further includes a first conductor portion,
wherein the first termination circuit is connected to a portion between the first transmission line and the first conductor portion, and
wherein a part of the first conductor portion is connected to any one of the surfaces of the metal portion other than the surface where the first transmission line is opposed to the other communication apparatus.

4. The communication apparatus according to claim 3,
wherein the first substrate further includes the second transmission line and a second conductor portion,
wherein the communication apparatus further comprises a second termination circuit connected to a portion between the first transmission line and the first conductor portion, and
wherein the second conductor portion is connected to any one of surfaces of the metal portion other than a surface where the first transmission line and the second transmission line are opposed to the other communication apparatus.

5. The communication apparatus according to claim 1, wherein the metal portion has an annular shape.

6. The communication apparatus according to claim 1, further comprising:
a second substrate including a third transmission line; and
a third termination circuit configured to terminate the third transmission line,
wherein the second substrate is fixed to any one of surfaces of the metal portion other than a surface where the third transmission line is opposed to the other communication apparatus.

7. The communication apparatus according to claim 6,
wherein the metal portion has a slit, and
wherein the first substrate and the second substrate are disposed in the slit of the metal portion and are fixed to any one of surfaces of the metal portion other than a surface where the first transmission line and the third transmission line are opposed to the other communication apparatus.

8. The communication apparatus according to claim 1, wherein the first transmission line is connected to a first signal source.

9. The communication apparatus according to claim 1, wherein the first substrate is a flexible printed circuit board.

10. The communication apparatus according to claim 1, wherein the first substrate is fixed to the metal portion with any one of a metal, a fastening, a conductive adhesive, and a conductive tape, and a combination thereof.

11. The communication apparatus according to claim 1, wherein the communication apparatus is used to communicate with either a network camera or a robot.

12. A communication system comprising:
a first communication apparatus including:
a first substrate including a first transmission line and a second transmission line;
a metal portion functioning as a ground for the first substrate and including a slit, a part of the metal portion being spaced apart from the first transmission line and the second transmission line;
a first termination circuit configured to terminate the first transmission line; and
a second terminal circuit configured to terminate the second transmission line,
wherein the communication apparatus communicates with another communication apparatus opposed to the communication apparatus using electric field coupling or magnetic field coupling,
wherein a part of the first substrate is inserted into the slit of the metal portion, and
wherein a part of the first substrate being fixed to any one of surfaces of the metal portion other than a surface where the first transmission line is opposed to the other communication; and
a second communication apparatus configured to wirelessly communicate with the first communication apparatus,
wherein the second communication apparatus includes a third substrate including a fourth transmission line.

* * * * *